July 17, 1956 L. B. BICHER, JR 2,754,544
FILM EXTRUSION DIE

Filed Feb. 2, 1954

INVENTOR
LEO B. BICHER, JR.

BY *Lynn Barratt Morris*

ATTORNEY

July 17, 1956 L. B. BICHER, JR 2,754,544
FILM EXTRUSION DIE
Filed Feb. 2, 1954 3 Sheets-Sheet 2

INVENTOR
LEO B. BICHER, JR.

BY *Lynn Barratt Morris*
ATTORNEY

July 17, 1956  L. B. BICHER, JR  2,754,544
FILM EXTRUSION DIE

Filed Feb. 2, 1954  3 Sheets-Sheet 3

INVENTOR
LEO B. BICHER, JR.

BY Lynn Barratt Morris
ATTORNEY

United States Patent Office 2,754,544
Patented July 17, 1956

2,754,544
FILM EXTRUSION DIE

Leo B. Bicher, Jr., Hackensack, N. J., assignor to E. I. du Pont de Nemours and Company, Wilmington, Del., a corporation of Delaware Application February 2, 1954, Serial No. 407,678

9 Claims. (Cl. 18—15)

This invention relates to a film extrusion die. More particularly it relates to a die for the extrusion of film with beaded edges. Still more particularly it relates to such a die which can be adjusted to form beads of different thicknesses. The invention also relates to an apparatus comprising such a die and a casting drum with grooved surfaces.

It has been proposed to extrude molten thermoplastic materials into sheets with thickened edges which can be grasped by suitable means so that it can be stretched in lateral and/or longitudinal directions. An apparatus suitable for this purpose which has a plurality of pairs of rows of guide rollers maintained in diverging paths is described in assignee's Alles and Heilman, U. S. application Serial No. 303,908, filed Aug. 12, 1952, now Patent 2,728,941 granted Jan. 3, 1955. It is important not only that the main film be of uniform thickness but also that (a) the beaded edges of these films be uniform in cross-section and uniformly spaced, and (b) the flash or edges of the film beyond the bead be held at a minimum width and be somewhat uniform in shape.

An object of this invention is to provide a simple and practical die for forming thermoplastic webs with beaded edges. Another object is to provide such a die which can be readily disassembled and reassembled with substituted parts to form films of different thicknesses. A still further object is to provide such an apparatus which will give uniform results over long periods of time. A still further object is to provide such an apparatus which can be used with organic polymeric materials of relatively high molecular weights and high melting points or ranges. Still other objects will be apparent from the following description of the invention.

The above objects are accomplished in accordance with the present invention which will now be described with reference to the accompanying drawings which constitute a part of this specification. In these drawings, similar characters of reference refer to corresponding parts in the various views.

Figure 1:
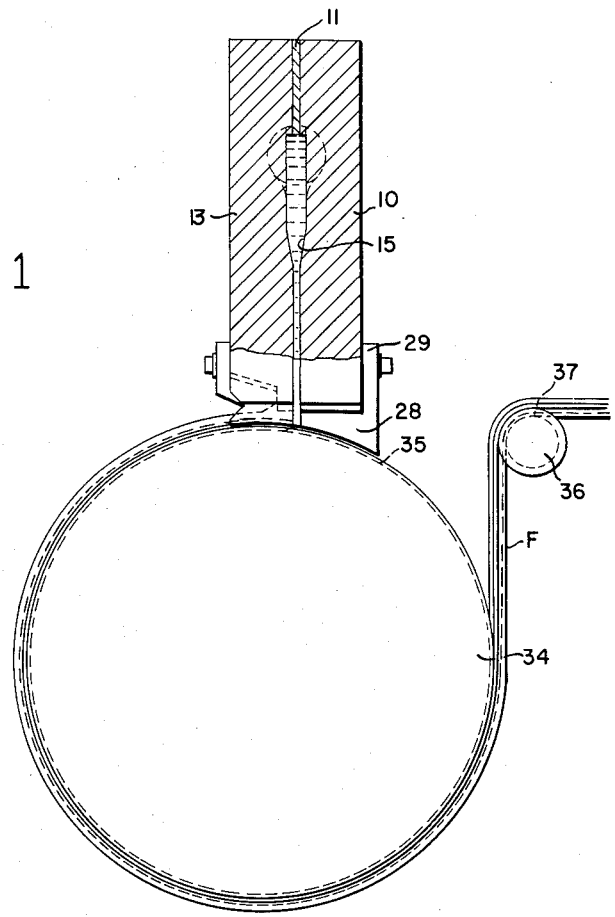
Fig. 1 is a schematic cross-sectional view with parts in elevation of the die, a cooperating drum and guide roller.

Referring now to the drawings, the extrusion die consists of a back block 10, spacer plates 11 and 12 and front block 13. The inner surfaces of these blocks are hollowed out between the confines of the spacer plates to form a reservoir 14. The bottom portion of the reservoir is essentially rectangular in area and in its transverse dimension is quite narrow so as to form a restricted passage for the polymer. The upper portion of the reservoir converges to form a conduit inlet 14'. The walls of the restricted bottom portion are essentially vertical and highly polished. Between the upper enlarged part of the reservoir and the restricted portion are tapered walls 15. Two spaced vertical narrow grooves 16 of relatively short depth are disposed at the edges of the rectangular area of the reservoir and they establish communication with the enlarged part of the reservoir and extend through to the bottom surfaces of die blocks 10 and 13.

The inner end walls of spacer plates 11 and 12 form with the inner surfaces of blocks 10 and 13 at their bottom surfaces a narrow rectangular extrusion orifice or lips. The ends of these lips will be T-shaped when the grooves 16 are in juxtaposition. However, L-shaped ends can be made by eliminating grooves from block 10. The portion of the reservoir below walls 15 has a similar cross-section. In addition, the lower ends of these grooves may have flared-out walls 16' for a short distance above the bottom of block 13.

Block 13 for convenience consists of two parts since this admits of careful machining of the grooves and orifice lips and other parts, which will be further explained. Thus, the lower outer end of block 13 has a portion cut away to form a rectangular shoulder 17 which is adapted to receive an upstanding projection 18 of lower body member 19 which is somewhat S-shaped. The inner surface of the leg of the S-shaped member constitutes an extension of the inner surfaces of the main block 13 above. This member 19 which is S-shaped in cross-section has two channel portions 20 in its bottom surface, each of which is adapted to receive two adjustable members 21 and 22. The inner vertical walls of these channel recesses are in the same vertical plane as the inner walls of grooves 16. Adjustable members 21 and 22 are, in general, L-shaped in cross-section and the vertical plate portions constituting their fronts have elongated transverse slots 23 through which locking screws 24 are passed which serve to hold the adjustable members in a predetermined position. The S-shaped member has threaded recesses (not shown in the interest of clarity) which are adapted to receive screws 24.

Figure 5:
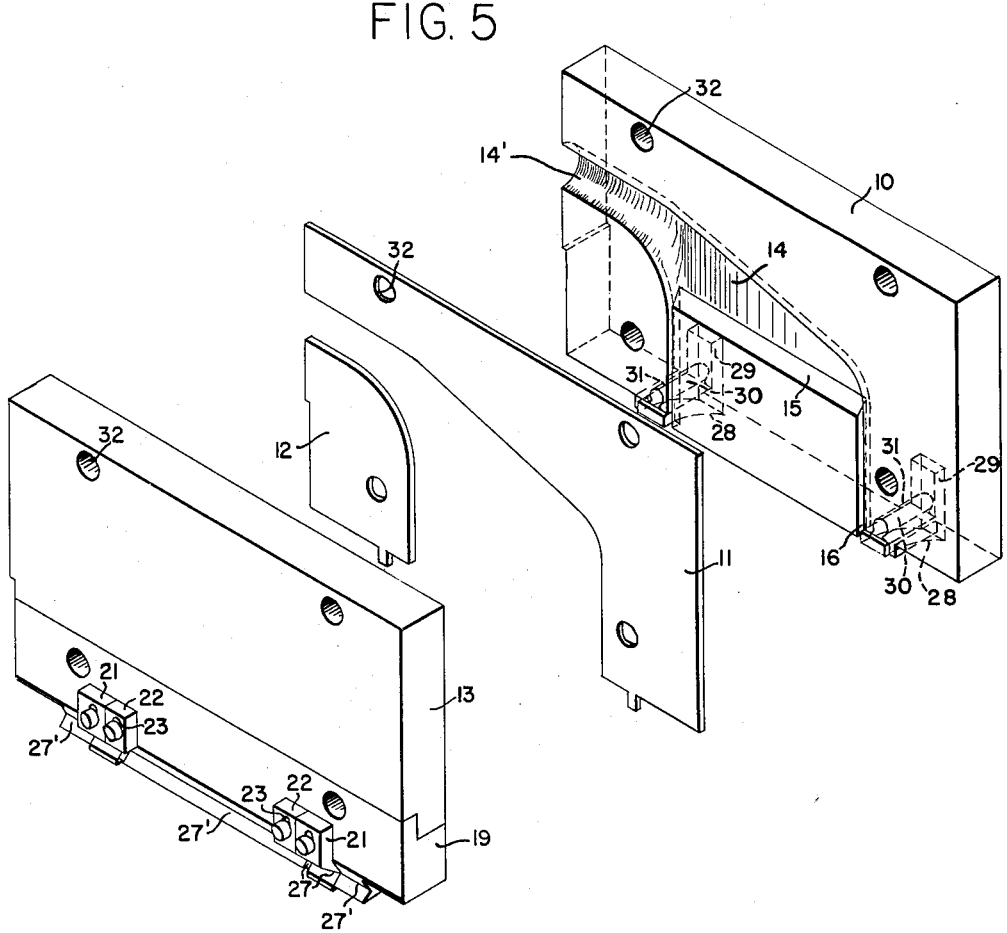
Fig. 5 is a perspective view of the extrusion die with parts in expanded juxtaposition.

The inner adjustable members 22 have depending leg portions 26 which are slightly narrower in width than grooves 16 and interfit in such grooves to control the height of the upper bead of the extruded film. Adjustable members 21 are curved along their bottom surfaces to constitute doctor blades for the flashing of the extruded film beyond bead 16. The front lower surface of members 21 preferably have a V-shaped groove 27. Members 22 are provided with similar grooves and the bottom front portion of S-shaped member 19 also has a V-shaped segment removed to form a trough 27' in the area between the adjustable members, as well as beyond such members, as more clearly shown in Fig. 5.

Figure 2:
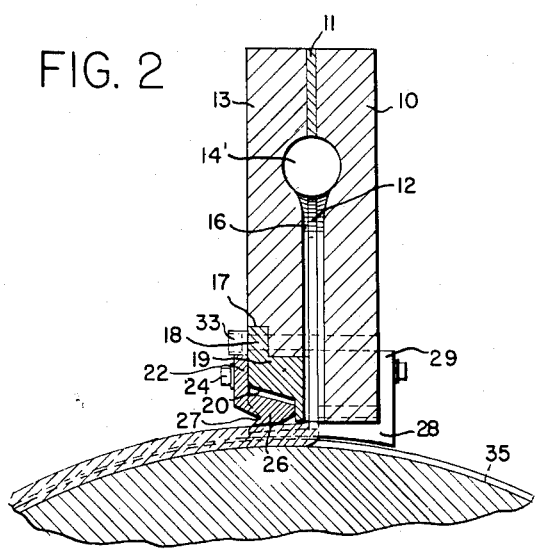
Fig. 2 is a vertical cross-sectional view of the extrusion die taken along the lines 2—2 of Fig. 3, showing a part of the extruded film and drum surface in elevation.
Figure 3:
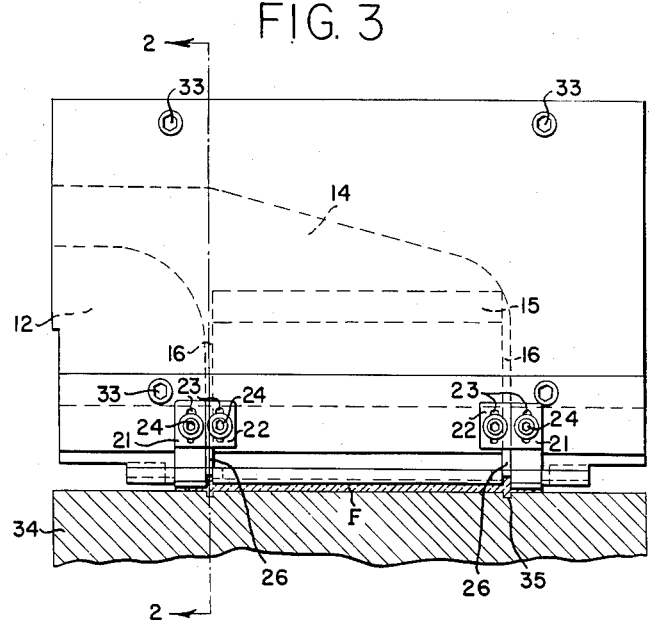
Fig. 3 is an elevation of the front of the die showing in section an extruded film and portion of the drum.
Figure 4:
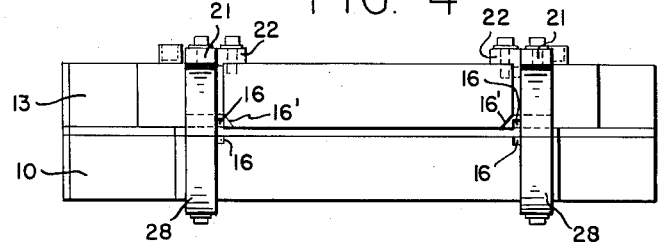
Fig. 4 is a bottom plan view of the extrusion die.

Block 10 has disposed on its bottom surface removable dam extension members 28 which are disposed adjacent the end of member 21. These members may have an upwardly projecting lug 29, as shown in Figs. 1 and 2, bolted to block 10 in the same manner as member 22 and a lower body portion, the bottom surface of which is curved to follow the circumference of the casting drum, and an upper key portion 30 which fits into a corresponding keyway 31 near the bottom surface of block 10. These keyways and the cooperating key portions of members 29 may be curved, as shown, or, if desired, may have vertical sides, or may have a flat upper surface and slanting side surfaces so that the key portion is essentially a trapezoid. Wedges or set screws can be used to lock the keys in the keyways, in place of the bolt construction shown in Figs. 1, 2 and 4.

By substituting spacer plates 11 and 12 of different thicknesses, one can adjust the device to make any desired thickness of film. The thickness of the flashing beyond the beads is controlled by members 21, 22 and 28. Similarly, and by substituting dam extension members 28 having bodies of different depths, one can effectively adjust the thickness of the film in the flashing adjacent to the beads.

Blocks 10 and 13 and spacer plates 11 and 12 are provided with a plurality of holes 32 through which bolts 33 can be passed to hold the parts in assembled relation. If desired, the holes in the block member 10 may be threaded to receive the threaded ends of bolts 33, or the latter can pass entirely through said block and be fastened with a nut. Obviously, if desired, various other means for holding the parts in assembled relation can be used. Smaller bolts can be used to hold the S-shaped member 19 to block 13 in place of or in addition to bolts 33.

The extrusion die can be mounted on any suitable supporting frame and placed above a casting drum 34 which, as shown, has spaced peripheral channels or grooves 35 that are disposed beneath grooves 16 in the die. Grooves 35 are essentially of the same cross-sectional dimensions as grooves 16 in block 10 so that upon extrusion of the film the extruded bead will fit in grooves 35 as the drum is revolved by suitable source of power. The extruded film passes around the drum for a distance adequate for it to set and the resulting film then passes over a guide roller 36 which may be provided with similarly spaced peripheral channels or grooves 37 to receive the beads on the outer surface of the extruded film F.

The blocks 10 and 13, if desired, can be provided with internal channels or ducts (not shown) for the circulation of a heat exchange medium so that the temperature of the polymer being extruded may be controlled. If desired, these channels may have lateral interfitting openings which cooperate with similar openings in the spacer plates so that the heat exchange medium may be fed into one block and out of the other. These features of construction are obvious, and, in order to avoid confusion with the parts of the device as shown, are not shown in the drawings. Suitable heat exchange media which can be circulated through the internal channels or ducts in blocks 10 and 13 include paraffin hydrocarbon heat transfer oils, diphenyl ether, chlorinated naphthalenes, and chlorinated biphenyls. Water can also be used as a heat exchange fluid. These media can be used in either liquid or vapor form.

The surfaces of the various parts of the extrusion die which contact the molten or liquefied material should be carefully machined and highly polished in order to obtain films having uniform dimensions and smooth surface characteristics. The surfaces of the drum and the guide roller should likewise be carefully machined and highly polished for similar reasons.

The parts of the die should be made of metal and are preferably made of a corrosion-resistant steel which can be annealed and hardened and which will take a high polish. The parts contacting the molten or liquid or extruded film should, of course, have hard surfaces in order to preserve the highly polished surfaces during sustained or continuous operations. Various types of die steels, stainless steel, including alloy steels, e. g., vanadium alloys, are commercially available and can be used to make the parts. They may also be composed of bronze, brass or titanium or a titanium alloy. The surface of the drum and the guide roller likewise should be hard and capable of taking a high polish and can be made of similar materials.

With regard to the spacer plate, it can be made of steel, bronze, brass, copper, aluminum or various types of alloys which do not have a deleterious effect upon the particular material to be extruded.

The thickness of the film extruded from the die (i. e., at the orifice) is controlled by the thickness of the spacer plates. By substituting plates of different thicknesses one can obtain any desired extruded film thickness. However, the thickness of the cast film is controlled primarily by the peripheral speed of the casting wheel. Thus, faster speeds cause greater draw-down of the extruded film. For example, by changing the peripheral speed of the drum the film thickness can be varied easily from 20 to 120 mils from the same extrusion orifice. The degree of draw-down and resulting thickness of the cast film are also markedly affected by the distance between the surface of the drum and the lips of the extrusion orifice. The thickness of the beads is controlled by the above factors and by the adjustment of members 21. The thickness of the flashing is, to a certain extent, controlled by the above factors, but is controlled primarily by the distance between the surfaces of the drum and dam members.

The width of the film is controlled by the distance the two channels 16 are spaced apart and, of course, by the distance the vertical inner edges of the spacer plates are spaced apart.

While an elongating slot and bolt arrangement is shown for adjusting members 21 and 22, it is obvious that other adjusting means can be used. Thus, a vernier screw mechanism can be attached to each of members 21 and 22. The vernier screws may be in a vertical position and extend through the block.

If desired, dam members 21 and dam extension members can be made in one piece. In such case the keys and keyways could be eliminated. An effective control of such a dam member can be had by connecting it to two vernier screws, one of each being in each block.

The operation of the apparatus described above will now be explained with reference to the extrusion of a particular thermoplastic material, namely, a non-oriented polyethylene terephthalate of the type described in Whinfield and Dickson U. S. P. 2,465,319 having a melting point between 200° C. and 300° C. and a viscosity in the range 1000 to 5000 poises. This polymer in molten condition is passed through a suitable connection into the lateral conduit inlet 14' where it flows into the upper portion of the reservoir and then downwardly through the narrow restricted portion and out through the lips formed by blocks 10 and 13 and spacer plates 11 and 12. This polymer, of course, also flows through the shaped ends of the orifice lips. These ends will be T-shaped when each of blocks 10 and 13 have grooves 16. They will be L-shaped when grooves 16 are eliminated from block 10. The polymer is extruded under a pressure from 50 to 100 pounds per square inch and passes out through the lips of the die at a speed of about 50 to about 300 inches per minute onto the surface of the casting drum 34 which is rotated to have a peripheral speed of about 50 to 300 inches per minute but preferably 25% to 200% faster than the speed of extrusion. The beads which are formed by the back block 10 of the die fit into peripheral channels or grooves 35 in the casting drum.

As an exemplary procedure a polyethylene terephthalate having a melting point above 200° C. is made by carrying out the polymerization at a temperature of 215° C. to 285° C. and under a vacuum of 0.5 mm. in a suitable reaction vessel. The molten polymer is pumped at a temperature of 265° C. to 275° C. and pressure of 50 to 100 pounds per square inch to the extrusion die described above, wherein the orifice has a width of 4.5 inches, internal orifice thickness is 0.090 inch, the bead-groove opening beyond the lip is 0.063 inch, the width of the bead-grooves is 0.125 inch, and the die lip is directly above the vertical axis of the drum and spaced 0.090 inch from the surface of the drum, the angle of the die axis from the vertical being 20 degrees, onto a casting drum having a diameter of 24 inches, a bead-groove depth of 0.036 inch and a bead-groove width of 0.125 inch, the drum being maintained at a temperature from 40 to 70° C. and having a peripheral speed of 50 to 300 inches per minute. The cast film, if desired, can pass, as described in my application Serial No. 405,710 entitled "Apparatus for Extruding Films," filed January 25, 1954, under a bead-forming calender roll having an outside diameter of 4.375 inches, a bead-groove depth of 0.036 inch and a bead-groove width of 0.125 inch, separated from the drum and passed over a grooved guide roller.

The extruded polyester film cools as it passes around the drum, which, if desired, can be provided with means for cooling it. Such means may be in the drum, e. g., ducts or passages for the circulation of a cooling fluid near its surface, or the cooling means may be separate and adjacent to the drum. The extruded and cast film after passing over a suitable guiding roller such as guide roller 36 can then be coated, if desired, with a suitable substratum, as described in Alles et al. U. S. P. 2,491,023. It can then be passed into a suitable stretching apparatus where it can be oriented by stretching it laterally or longitudinally, in either order, or simultaneously. A useful stretching apparatus is described in said Alles and Heilman U. S. Patent 2,728,941.

It will be apparent to those skilled in the art that the present processes and apparatus are not limited to the stretching of polyethylene terephthalate films but can be used in stretching thermoplastic films composed of many diverse materials. Among such materials which can be extruded are resins and superpolymers, e. g., nylon, polyethylene, polystyrene, polyvinyl halides, e. g., polyvinyl chloride, polyvinyl acetate, rubber hydrochloride; cellulose derivatives, e. g., cellulose acetate, cellulose formate, cellulose propionate, cellulose acetate butyrate; methyl, ethyl, butyl, benzyl, allyl and crotyl ethers of cellulose; polyesters from glycols and aliphatic dibasic acids, polyesteramides, etc. The films so extruded, moreover, especially when they are used as photographic film base, may be coated with various materials including the vinylidene chloride copolymers described in Alles et al. U. S. Patent 2,491,023, to form sublayers.

The extrusion die and pipes from the source of supply of molten or liquefied material to be extruded should be covered with an insulating material so that the material will have a constant temperature during the extrusion operation. Also, the pipes and die can be provided with suitable jackets for the circulation of a heat-exchange liquid or vapor so that the polymer can be maintained at the proper elevated temperature.

With regard to dimensions for the above apparatus, it has been found that a casting drum diameter of 24 inches will give adequate results but the diameter may vary from 12 to 60 or more inches. The bead grooves, in general, may vary in depth from zero to 0.100 inch or more and in width from 0.080 to 0.250 inch or more. With materials such as polyethylene terephthalates, the lips of the extrusion die can be maintained at a distance of about 0.010 to 0.150 inch above the surface of the casting drum. The die lips, in general, may be spaced from 0.030 to 0.180 inch apart and the bead-forming grooves in the die and on the drum from 2 to 30 inches or more apart.

An advantage of this invention is that it provides a simple yet effective apparatus for producing a film of uniform thickness with uniform beaded edges. Another advantage resides in the fact that the apparatus gives uniform results over long periods of time without adjustment. A further advantage is that the equipment is relatively small in size and does not require an expensive frame to maintain it in operative relation. A still further advantage resides in the fact that the character of the extruded film can be closely observed during the extrusion operation. The apparatus is simple and relatively inexpensive to make and assemble. A further economic advantage is that the adjustable dams keep the flashing beyond the beaded edges to a minimum thickness and area. Since the edge beads and flashing are scrapped after the extruded film is oriented, this means that the apparatus is more efficient and less material has to be scrapped. Still other advantages of the apparatus will be apparent from the above description.

The embodiments of the invention in which an exclusive property or privilege is claimed are defined as follows.

What is claimed is:

1. An extrusion die comprising a front block, two spacer plates and a rear block in juxtaposition, said blocks having their inner surfaces hollowed out to define with said spacer plates an upper reservoir, an entrance passage and a narrow restricted exit passage terminating in an elongated narrow rectangular orifice lip the ends of which have lateral bead-forming vertical grooves of small cross-section, two of said grooves being situated in the same inner surface of at least one block and extending into and communicating with said upper reservoir; said front block carrying two spaced vertically-adjustable, bead-controlling members each extending into the lower end of its respective groove to vary its depth, and at least one of said blocks carrying two vertically-adjustable dam members having curved-bottom doctoring-surfaces to control the flashing beyond said grooves of an extruded film.

2. An extrusion die comprising a front block, two spacer plates and a rear block in juxtaposition, said blocks having their inner surfaces hollowed out to define with said spacer plates an upper reservoir, an entrance passage and a narrow restricted exit passage terminating in an elongated narrow rectangular orifice lip the ends of which have lateral bead-forming vertical grooves of small cross-section, two of said grooves being situated in the same inner surface of at least one block and extending into and communicating with said upper reservoir; said front block carrying two spaced vertically-adjustable, bead-controlling members each extending into the lower end of its respective groove to vary its depth, said front block carrying two vertically-adjustable dam members having curved-bottom doctoring-surfaces to control the flashing beyond said grooves of an extruded film.

3. A die as set forth in claim 2 wherein the front block is divided into two interfitting parts the lower part bearing said adjustable bead-controlling and dam members and having a bottom doctoring surface located between and laterally beyond said members.

4. An extrusion die comprising a front block, two spacer plates and a rear block in juxtaposition, said blocks having their inner surfaces hollowed out to define with said spacer plates an upper reservoir, an entrance passage and a narrow restricted exit passage terminating in an elongated narrow rectangular orifice lip the ends of which have lateral bead-forming vertical grooves of small cross-section, two of said grooves being situated in the same inner surface of at least one block and extending into and communicating with said upper reservoir; said front block carrying two spaced vertically-adjustable, bead-controlling members each having a leg portion which extends into the lower end of its respective groove to vary its depth, and two vertically-adjustable dam members having curved-bottom doctoring-surfaces adjacent said first members to control the flashing beyond said grooves of an extruded film, the rear block carrying similarly spaced dam extension members adjacent said adjustable dam members; and means for maintaining each of said members in a predetermined position.

5. A die as set forth in claim 3 wherein said dam extension members have key portions that fit into keyways in said back block.

6. An extrusion die comprising a front block, two spacer plates and a rear block in juxtaposition, said blocks having their inner surfaces hollowed out to define with said spacer plates an upper reservoir, an entrance passage and a narrow restricted exit passage terminating in an elongated narrow rectangular orifice lip the ends of which have lateral bead-forming vertical grooves of small cross-section, two of said grooves being situated in the same inner surface of at least one block and extending into and communicating with said upper reservoir; said front block carrying two spaced vertically-adjustable, bead-controlling members each extending into the lower end of its respective groove to vary its depth, and at least one of said blocks carrying two vertically-adjustable dam members having curved-bottom doctoring-surfaces to control the flashing beyond said grooves of an extruded film in combination with a drum beneath said die.

7. An extrusion die comprising a front block, two spacer plates and a rear block in juxtaposition, said blocks having their inner surfaces hollowed out to define with said spacer plates an upper reservoir, an entrance passage and a narrow restricted exit passage terminating in an elongated narrow rectangular orifice lip the ends of which have lateral bead-forming vertical grooves of small cross-section, two of said grooves being situated in the same inner surface of at least one block and extending into and communicating with said upper reservoir; said front block carrying two spaced vertically-adjustable, bead-controlling members each extending into the lower end of its respective groove to vary its depth, and at least one of said blocks carrying two vertically-adjustable dam members having curved-bottom doctoring-surfaces to control the flashing beyond said grooves of an extruded film, said drum having peripheral grooves situated beneath the grooves in said die.

8. An apparatus comprising an extrusion die comprising a front block, two spacer plates and a rear block in juxtaposition, said blocks having their inner surfaces hollowed out to define with said spacer plates an upper reservoir, an entrance passage and a narrow restricted exit passage terminating in an elongated narrow rectangular orifice lip having T-shaped ends and having lateral bead-forming vertical grooves of small cross-section, two of said grooves being situated in the inner surface of each block and extending into and communicating with said upper reservoir; said front block carrying two spaced vertically-adjustable, bead-controlling members each extending into the lower end of its respective groove to vary its depth, similarly mounted adjustable dam members having curved-bottom doctoring-surfaces adjacent said first members to control the flashing beyond said grooves of an extruded film, and means for holding each of said members in a predetermined position, in combination with a drum beneath said die, said drum having peripheral grooves situated beneath said grooves in said die.

9. An extrusion die comprising a front block, two spacer plates and a rear block in juxtaposition, said blocks having their inner surfaces hollowed out to define with said spacer plates an upper reservoir, an entrance passage and a narrow restricted exit passage terminating in an elongated narrow rectangular orifice lip the ends of which have lateral bead-forming vertical grooves of small cross-section, two of said grooves being situated in the same inner surface of at least one block and extending into and communicating with said upper reservoir; said front block carrying two spaced vertically-adjustable, bead-controlling members each extending into the lower end of its respective groove to vary its depth, and at least one of said blocks carrying two vertically-adjustable dam members having curved-bottom doctoring-surfaces to control the flashing beyond said grooves of an extruded film in combination with a drum beneath said die and a film guiding roller for directing a cast film from the drum.

References Cited in the file of this patent

UNITED STATES PATENTS

| | | |
|---|---|---|
| 2,026,740 | Kinsella et al. | Jan. 7, 1936 |
| 2,295,394 | Fordyce et al. | Sept. 8, 1942 |
| 2,479,804 | Bailey et al. | Aug. 23, 1949 |
| 2,628,386 | Thornberg | Feb. 17, 1953 |

FOREIGN PATENTS

| | | |
|---|---|---|
| 123,588 | Australia | Feb. 27, 1947 |